P. L. ALLAIRE.
ILLUMINATING GAS APPARATUS.
No. 170,799. Patented Dec. 7, 1875.
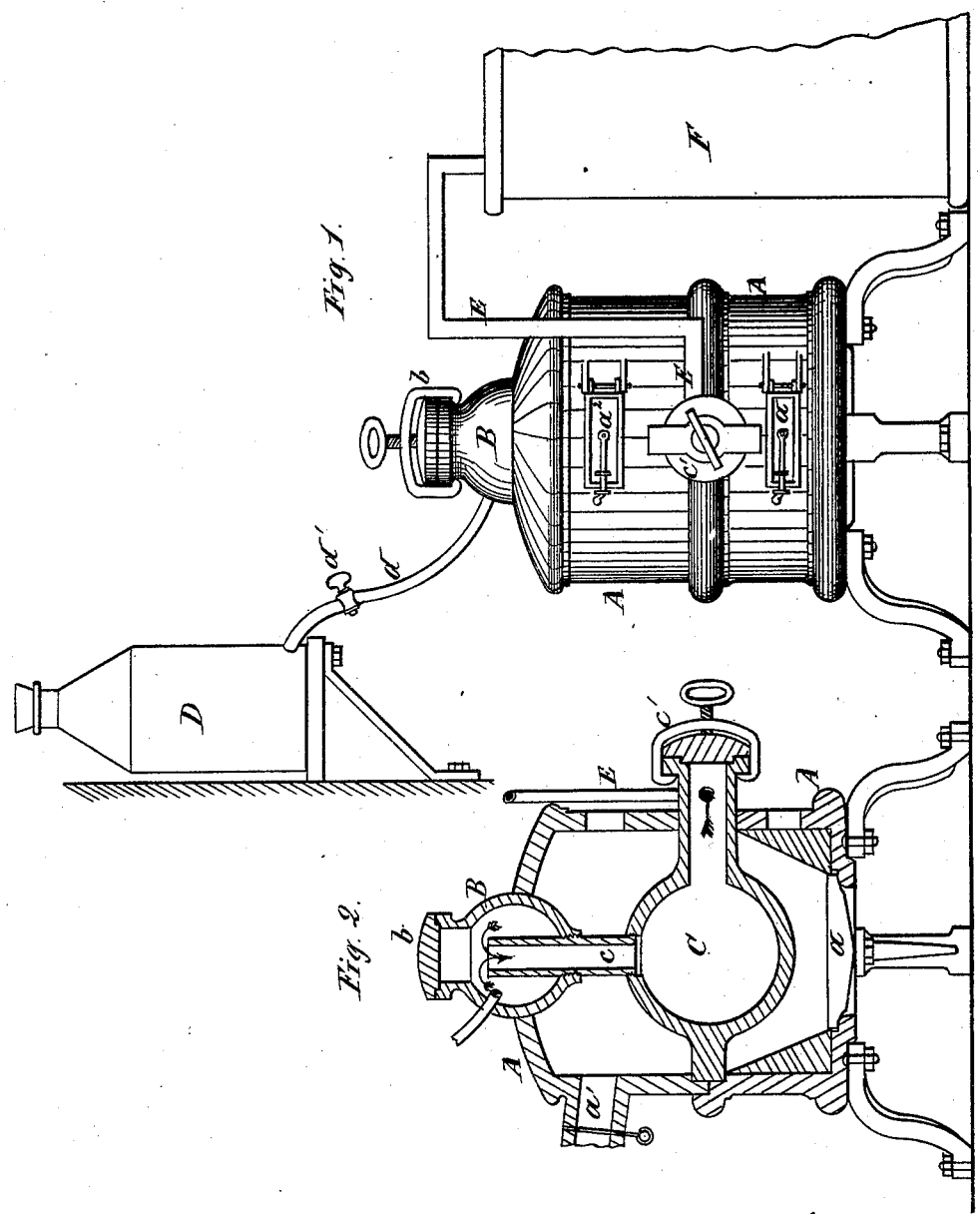
Witnesses
Henri Guillaume
Chas. Jacobsen
Inventor
Pierre Léon Allaire
pr. Henry Orth
atty

UNITED STATES PATENT OFFICE.

PIERRE LÉON ALLAIRE, OF PARIS, FRANCE.

IMPROVEMENT IN ILLUMINATING-GAS APPARATUS.

Specification forming part of Letters Patent No. 170,799, dated December 7, 1875; application filed August 11, 1875.

*To all whom it may concern:*

Be it known that I, PIERRE LÉON ALLAIRE, of the city of Paris, in the Department of the Seine and Republic of France, have invented new and useful Improvements in an Apparatus for the Production of Gas from Hydrocarbons or other volatile mineral and vegetable oils, of which the following is a specification:

The efforts heretofore made in using the volatile oils for the manufacture of illuminating-gas, and especially from the hydrocarbons, have only been partially successful, and the success obtained in the manufacture is a highly-brilliant light; but the cost of the apparatus employed, as well as the cost of manufacturing the gas from said oils, have prevented its more general use.

The object of my invention is not only to produce a gas of the required illuminating qualities, but also the construction of an apparatus at once simple, hence cheap, and so arranged that it may be made portable or stationary, as required or desired, and of easy manipulation.

In order to produce this gas I subject the oil to vaporization, and subsequently to distillation or decomposition, the latter process serving to remove all the non-volatile parts from the vapors of the oil employed; and to that effect the apparatus consists of a casing provided with a fire-grate or furnace, over which are arranged two spherical vessels superposed to each other; or the outer configuration of the vessels may be of any desired form, provided their inner faces are curved or spherical. The upper vessel, farthest from the heat of the fire, serves to vaporize the oils as fast as they are fed thereto by a pipe from a convenient reservoir, the vapors escaping through a pipe into the lower vessel, where the intensity of the heat from the furnace decomposes the vapors, separating therefrom all the non-volatile parts which remain in the bottom of said vessel, while the gases so purified escape through a pipe into a cooler, and from there to the receiver or gasometer.

But that my invention may be fully understood, I will describe the same in detail by aid of the accompanying drawings, in which—

Figure 1 is an elevation, and Fig. 2 a vertical section, of an apparatus constructed according to my invention.

A is the shell or casing, which may be of cast-iron, or cast-iron and refractory clay, or of brick-work, provided with a suitable furnace-door, $a$, and a flue or chimney, $a^1$. B is a spherical vessel, or of any other outer configuration, having its inner sides curved or spherical. This vessel is connected with the reservoir D, containing the supply of oil, by means of a pipe, $d$, which is provided with a regulating-cock, $d'$, so that the flow of oil into the vessel B may be regulated as required. The vessel B is further provided with a screw-cap, $b$, forming a man-hole, whereby access may be had to said vessel B. C is another spherical vessel, communicating with, or connected to, the vessel B by means of a pipe, $c$, which enters the bottom of the vessel B, and projects upward into said vessel to near its upper inner surface, so as to prevent any oil passing into said pipe $c$. The vessel C is also provided with a suitable man-hole, $c'$, and a pipe, E, through which the gas is carried into the cooler or refrigerator F, and thence to the gasometer or holder. The two vessels B C are superposed, the former having one-half, more or less, of its diameter exposed to the heat, and rests in an aperture formed in the top of the casing, as shown.

The oil, being fed to this vessel, is here subjected to vaporization at a temperature of about 200°. The vapors, escaping through the tube or pipe $c$, enter the vessel C, which is immediately over the fire or grate $a$, and here the vapors are decomposed under a temperature of about 800°. The products of decomposition—that is to say, first the non-volatile parts of the vapors—fall to the bottom of the vessel C, to be removed therefrom through the man or hand hole $c'$, while the purified gases escape through the pipe E into the refrigerator or cooling-tank F, from whence they go into the gasometer, ready for consumption.

The flue $a^1$ is provided with a suitable damper, and the upper portion of the shell or casing has a door, $a^2$, opposite, or nearly so, to the vessel B, for regulating the temperature in the upper portion of the shell or casing, so that the heat may always be sufficient under the vessel B to vaporize the oil.

I prefer the use of hollow spherical vessels, as by this configuration the apparatus can be made more compact, though other vessels having a different outer configuration may be used. It is essential, however, that the inner faces of the vessels B C should be curved or spherical.

Having described my invention, what I claim, and desire to secure by Letters Patent, is—

The combination of the spherical retorts B C with the connecting-pipes $c$, provided with a screw-thread on either end, whereby the position of the upper retort may be regulated in such a manner as to insure that it shall fit the aperture in the upper part or dome of the shell, substantially as specified.

In testimony that I claim the foregoing I have hereunto set my hand this 7th day of January, 1875.

PIERRE LÉON ALLAIRE.

In presence of—
  ROBT. M. HOOPER,
  JEAN BAPTISTE GIRARD.